United States Patent
Zhou et al.

(10) Patent No.: US 8,591,768 B2
(45) Date of Patent: Nov. 26, 2013

(54) GERMANATE LUMINESCENCE MATERIAL AND ITS PREPARATION

(75) Inventors: Mingjie Zhou, Shenzhen (CN); Wenbo Ma, Shenzhen (CN); Zhaopu Shi, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/256,936

(22) PCT Filed: Mar. 18, 2009

(86) PCT No.: PCT/CN2009/070877
§ 371 (c)(1),
(2), (4) Date: Sep. 16, 2011

(87) PCT Pub. No.: WO2010/105424
PCT Pub. Date: Sep. 23, 2010

(65) Prior Publication Data
US 2012/0012786 A1    Jan. 19, 2012

(51) Int. Cl.
C09K 11/66    (2006.01)
C09K 11/08    (2006.01)
C09K 11/02    (2006.01)
C09K 11/77    (2006.01)

(52) U.S. Cl.
USPC ............................. 252/301.4 F; 252/301.4 R

(58) Field of Classification Search
USPC ..................................... 252/301.4 R, 301.4 F
See application file for complete search history.

(56) References Cited

U.S. PATENT DOCUMENTS 6,707,249 B2 * 3/2004 Minami et al. ................ 313/504

OTHER PUBLICATIONS

International Search Report for PCT Patent Application No. PCT/CN2009/070877.
Park, Joung Kyu, et. al., Photoluminescence Properties of Eu3+ -Activated Y2GeO5 Phosphors, Journal of The Electrochemical Society, 2003, 150 (8), pp. 187-191.
Zhao Fei, et. al., Luminescent Properties of Eu3+, Tb3+ or Bi3+ Activated Yttrium Gemanates, Materials Research Bulletin, 2003, 38, pp. 931-940.
Guo Peimin, et. al., Novel Phosphors of Eu3+, Tb3+ or Bi3+ Activated Gd2GeO5, Journal of Luminescence, 2003, 105, pp. 61-67.

* cited by examiner

*Primary Examiner* — Carol M Koslow
*Assistant Examiner* — Matthew E Hoban

(57) ABSTRACT

A kind of germanate luminescence material and its preparation. The germanate luminescence material is a compound of following formula: $(Y_{1-x}Ln_x)_2GeO_5$, or Y in the said formula is partly or entirely substituted by at least one of Gd, Lu, Sc and La, and x is $0<x\leq0.3$, and Ln is one of Ce, Tm, Ho, Sm, Tb, Eu and Dy. The preparation is grinding the raw material, and then sintering at 1300-1500° C. for 6-24 h, and cooling the sintered product to room temperature, and obtaining the germanate luminescence material.

6 Claims, 2 Drawing Sheets

GERMANATE LUMINESCENCE MATERIAL AND ITS PREPARATION

FIELD OF THE INVENTION

The present invention belongs to photoelectron and lighting technical field and relates to a fluorescent material and its preparation, in particular to a germanate luminescence material and its preparation. The germanate luminescence material can be applied in multicolor lighting devices including the semiconductor LED lighting component.

BACKGROUND OF THE INVENTION

With the development of semiconductor lighting technology (LED), such revolutionary new lighting resource has been gradually come into our daily life. When the third generation semiconductor material gallium nitride is applied as the semiconductor lighting source, its power consumption is just 1/10 of that of a common incandescent lamp under an equal brightness and its lifetime can reach more than one million hours. As a new-type lighting technology, LED possesses many advantages such as energy saving, green environment-friendly and flexible application etc. and can be applied in fields of direction, display, decoration, backlight and general lighting widely, which is going to bring about a revolution in the lighting field. Therefore, efficient fluorescent materials which are capable of converting the blue violet light emitted by a lighting component (including LED) into a visible light thus realizing applications in the white and multicolor lighting devices, are in an urgent need.

In the present technical field, the main approach for achieving a LED white light emission is through the coordination of a blue light LED chip and Ce-activated rare earth garnet yellow fluorescent powder (such as YAG:$Ce^{3+}$ or TAG:$Ce^{3+}$), i.e. a white light emission is achieved through the complexing of the yellow light emitted by fluorescent material excited by the blue light chip and partial blue light of the blue chip. However, for such method, the used fluorescent material has tremendous limitations in application in white light LED and properties for that there are two obvious shortages namely low color rendering and high color temperature, and will be replaced by "UV-LED+tricolor fluorescent powder of red, green and blue" in future. Thus, the exploitation on a tricolor fluorescent powder suitable for UV-LED is very important.

SUMMARY OF THE INVENTION

The objective of the present invention is to provide a germanate luminescence material which has good luminescent property and is suitable for the excitation of a lighting component in the range of ultra violet and blue light (220-480) to realize the emission of red, green and blue light, aiming at the drawbacks of low color rendering and high color temperature in the prior art.

The objective of the present invention is to provide a method for preparing germanate luminescence material with simple technical process and product of stable quality.

According to an aspect, a first kind of germanate luminescence material is provided, which is a compound of following formula: $(Y_{1-x}Ln_x)_2GeO_5$, wherein a range of x is $0<x\leq0.3$ and Ln is one selected from a group of Ce, Tm, Ho, Sm, Tb, Eu and Dy.

In the first kind of germanate luminescence material, the range of x is preferably $0<x\leq0.2$.

According to an aspect, a second kind of germanate luminescence material is provided, which is a compound of following formula: $(Y_{1-x}Ln_x)_2GeO_5$, wherein Y in the formula is partly or entirely substituted by at least one selected from a group of Gd, Lu, Sc and La, wherein a range of x is $0<x\leq0.3$ and Ln is one selected from a group of Ce, Tm, Ho, Sm, Tb, Eu and Dy.

In the second kind of germanate luminescence material, the range of x is preferably $0<x\leq0.2$.

According to an aspect, a method for preparing a first kind of germanate luminescence material is provided which comprises taking oxide of Y, Ln or Ge, carbonate of Y, Ln or Ge, oxalate of Y, Ln or Ge, acetate of Y, Ln or Ge, nitrate of Y, Ln or Ge, or halide of Y, Ln or Ge as raw material, wherein Ln is one selected from a group of Ce, Tm, Ho, Sm, Tb, Eu and Dy; grinding the raw material uniformly, and then sintering the raw material at 1300-1500° C. for 6-24 h, and cooling a sintering product to room temperature, and obtaining the germanate luminescence material.

In the method for preparing the first kind of germanate luminescence material, the method comprises grinding the raw material uniformly and then sintering the raw material at 1350-1450° C. for 8-20 h preferably.

In the method for preparing the first kind of germanate luminescence material, the method comprises weighing the raw material in a stoichiometric ration of chemical formula $(Y_{1-x}Ln_x)_2GeO_5$, that is, weighing the raw material in accordance with the molar ration of each element in the chemical formula.

According to an aspect, a method for preparing a second kind of germanate luminescence material is provided, which comprises taking oxide of Ln or Ge, carbonate of Ln or Ge, oxalate of Ln or Ge, acetate of Ln or Ge, nitrate of Ln or Ge, or halide of Ln or Ge, and oxide of Gd, Lu, Sc, La or/and Y, carbonate of Gd, Lu, Sc, La or/and Y, oxalate of Gd, Lu, Sc, La or/and Y, acetate of Gd, Lu, Sc, La or/and Y, nitrate of Gd, Lu, Sc, La or/and Y or halide of Gd, Lu, Sc, La or/and Y as raw material; wherein Ln is one selected from a group of Ce, Tm, Ho, Sm, Tb, Eu and Dy; grinding the raw material uniformly, and then sintering the raw material at 1300-1500° C. for 6-24 h, and cooling a sintered product to room temperature, and obtaining the germanate luminescence material.

In the method for preparing the second kind of germanate luminescence material, the method comprises grinding the raw material uniformly and then sintering the raw material at 1350-1450° C. for 8-20 h preferably.

In the method for preparing the second kind of germanate luminescence material, the method comprises weighing the raw material in a stoichiometric ration of chemical formula $(Y_{1-x}Ln_x)_2GeO_5$, that is, weighing the raw material in accordance with the molar ration of each element in the chemical formula.

The germanate luminescence material of the present invention is the luminescence material doping rare earth ion Y, Gd, Lu, Sc, La, Ce, Tm, Ho, Sm, Tb, Eu or Dy in germanate, which has enhanced lighting property and is more suitable for the excited luminescence of a lighting component in the range of ultra violet and blue light (220-480) and capable of achieving the emission of red, green or blue light due to the addition of rare earth ion.

The method for preparing the germanate luminescence material of the present invention is simple and reliable in technical process, has high quality product and can be applied in a great quantity of industrialization production.

BRIEF DESCRIPTION OF THE DRAWINGS

The present invention will be further described with reference to the accompanying drawings and examples in the following. In the Figures.

Wherein, the excitation and emission spectrums are detected by SHIMADZU RF-5301PC fluorescence spectrophotometer.

DETAILED DESCRIPTION OF THE PREFERRED EXAMPLE

Example 1

Figure 1:
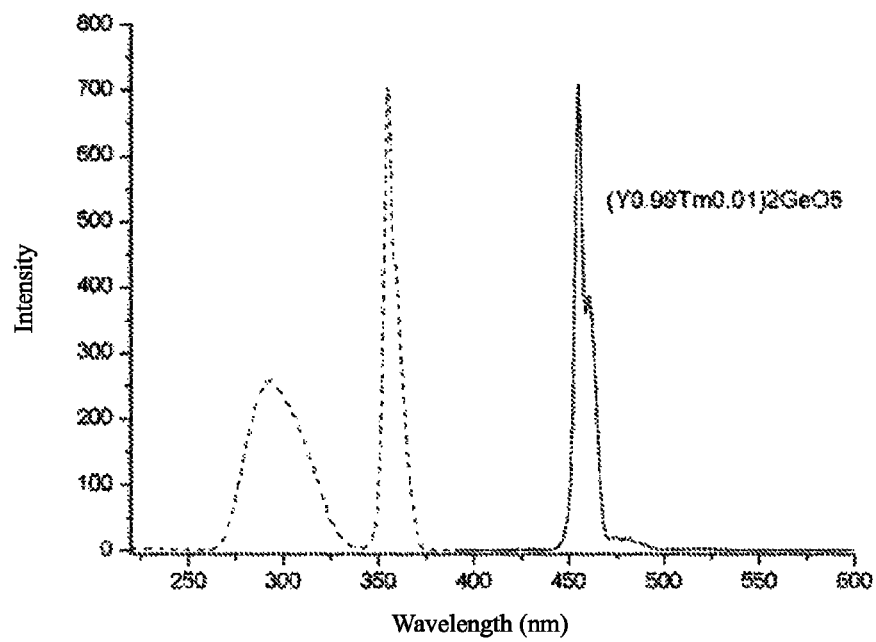
FIG. 1 is the excitation and emission spectrums of the germanate luminescence material $(Y_{0.99}Tm_{0.01})_2GeO_5$ prepared in the example 1.

$(Y_{0.99}Tm_{0.01})_2GeO_5$ Prepared by High Temperature Solid Phase Method 0.99 mmol $Y_2O_3$, 0.01 mmol $Tm_2O_3$ and 1 mmol $GeO_2$ are placed in an agate mortar and ground to be mixed uniformly. Then the powder is transferred to a corundum crucible and placed in a high temperature furnace to be sintered at 1350° C. for 10 h. A sintered product is then placed in a mortar and ground to be uniform after cooling to room temperature and a blue emission fluorescent powder $(Y_{0.99}Tm_{0.01})_2GeO_5$ is obtained therewith. FIG. 1 is the excitation and emission spectrums of $(Y_{0.99}Tm_{0.01})_2GeO_5$. It can be seen from the figure that the sample has two excitation peaks when monitored at 455 nm and emits a blue light of 455 nm when excited at 355 nm.

Example 2

$(Y_{0.99}Tm_{0.01})_2GeO_5$ Prepared by High Temperature Solid Phase Method 1.98 mmol $Y(NO_3)_3$, 0.02 mmol $Tm(NO_3)_3$ and 1 mmol $GeO_2$ are placed in an agate mortar and ground to be mixed uniformly. The remaining steps are the same as those in the example 1 and a blue emission fluorescent powder $(Y_{0.99}Tm_{0.01})_2GeO_5$ is obtained.

Example 3

$(Y_{0.99}Ce_{0.01})_2GeO_5$ Prepared by High Temperature Solid Phase Method 0.99 mmol $Y_2O_3$, 0.01 mmol $CeO_2$ and 1 mmol $GeO_2$ are placed in an agate mortar and ground to be mixed uniformly. Then the powder is transferred to a corundum crucible and placed in a gas mixture of nitrogen and hydrogen in a high temperature tube-type furnace to be sintered at 1450° C. for 8 h, wherein the volume ratio of nitrogen and hydrogen is 95:5. A sintered product is then placed in a mortar and ground to be uniform after cooling to room temperature and a blue emission fluorescent powder $(Y_{0.99}Ce_{0.01})_2GeO_5$ is obtained therewith.

Example 4

$(Y_{0.99}Ho_{0.01})_2GeO_5$ Prepared by High Temperature Solid Phase Method 0.99 mmol $Y_2O_3$, 0.01 mmol $Ho_2O_3$ and 1 mmol $GeO_2$ are placed in an agate mortar and ground to be mixed uniformly. Then the powder is transferred to a corundum crucible and placed in a high temperature furnace to be sintered at 1500° C. for 6 h. A sintering product is then placed in a mortar and ground to be uniform after cooling to room temperature and a green emission fluorescent powder $(Y_{0.99}Ho_{0.02})GeO_5$ is obtained therewith.

Example 5

$(Y_{0.98}Sm_{0.02})_2GeO_5$ Prepared by High Temperature Solid Phase Method 0.98 mmol $Y_2O_3$, 0.02 mmol $Sm_2O_3$ and 1 mmol $GeO_2$ are placed in an agate mortar and ground to be mixed uniformly. Then the powder is transferred to a corundum crucible and placed in a high temperature furnace to be sintered at 1300° C. for 20 h. A sintered product is then placed in a mortar and ground to be uniform after cooling to room temperature and a red emission fluorescent powder $(Y_{0.98}Sm_{0.02})_2GeO_5$ is obtained therewith.

Example 6

$(Y_{0.98}Dy_{0.02})_2GeO_5$ Prepared by High Temperature Solid Phase Method 0.98 mmol $Y_2O_3$, 0.02 mmol $Dy_2O_3$ and 1 mmol $GeO_2$ are placed in an agate mortar and ground to be mixed uniformly. Then the powder is transferred to a corundum crucible and placed in a high temperature box-type furnace to be sintered at 1320° C. for 24 h. A sintered product is then placed in a mortar and ground to be uniform after cooling to room temperature and a white emission fluorescent powder $(Y_{0.98}Dy_{0.02})_2GeO_5$ is obtained therewith.

Example 7

Figure 2:
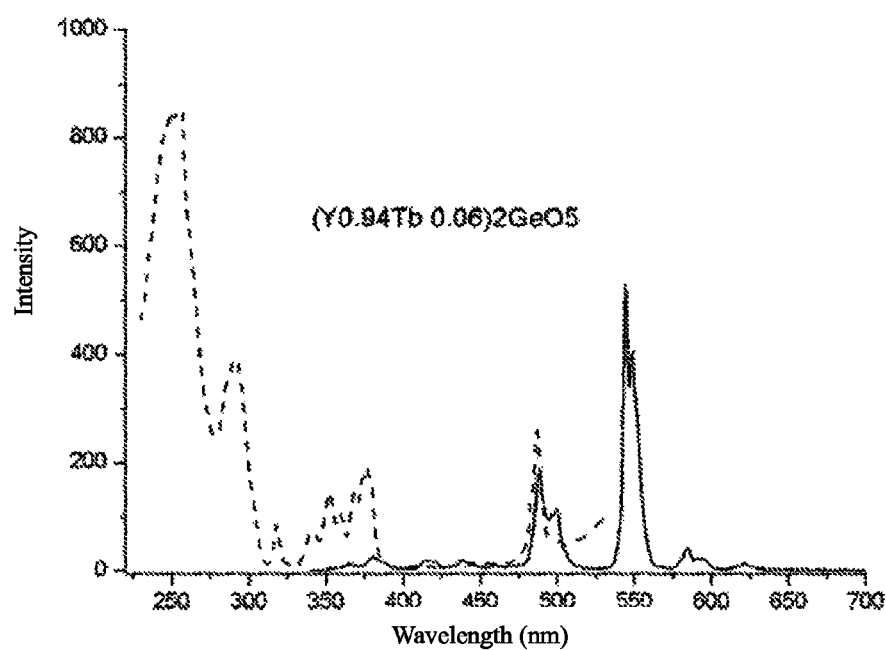
FIG. 2 is the excitation and emission spectrums of the germanate luminescence material $(Y_{0.94}Tb_{0.06})_2GeO_5$ prepared in the example 7.

$(Y_{0.94}Tb_{0.06})_2GeO_5$ Prepared by High Temperature Solid Phase Method 0.94 mmol $Y_2O_3$, 0.015 mmol $Tb_4O_7$ and 1 mmol $GeO_2$ are placed in an agate mortar and ground to be mixed uniformly. The remaining steps are the same as those in example 3 and a green emission fluorescent powder $(Y_{0.94}Tb_{0.06})_2GeO_5$ is obtained therewith. FIG. 2 is the excitation and emission spectrums of $(Y_{0.94}Tb_{0.06})_2GeO_5$. It can be seen from the figure that the sample has multiple excitation peaks at 253 nm, 290 nm and 378 nm and so on when monitored at 544 nm and can emit a green light of 544 nm when excited at 378 nm.

Example 8

Figure 3:
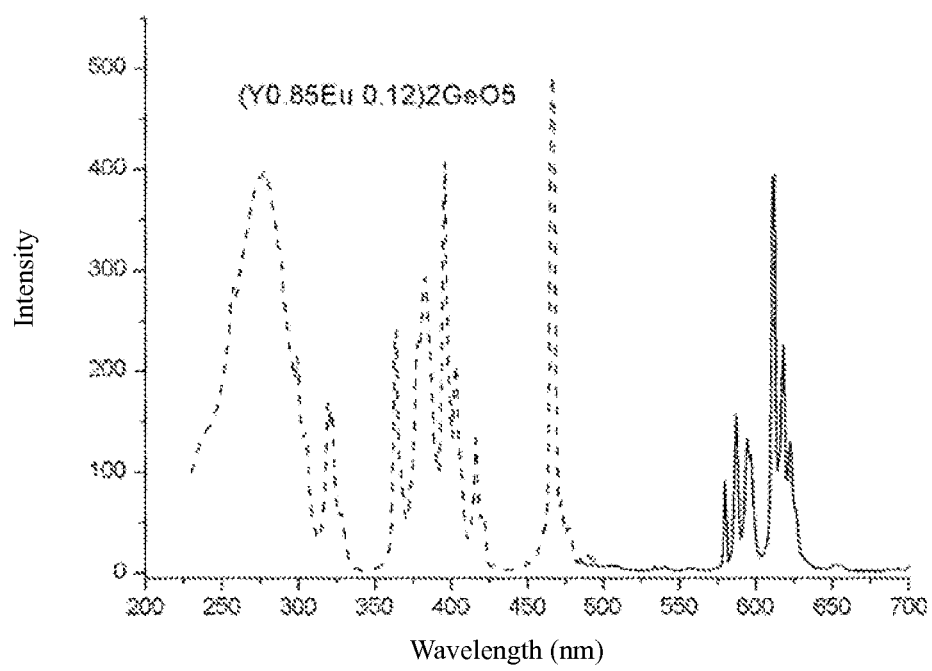
FIG. 3 is the excitation and emission spectrums of the germanate luminescence material $(Y_{0.85}Eu_{0.12})_2GeO_5$ prepared in the example 8.

$(Y_{0.85}Eu_{0.12})_2GeO_5$ Prepared by High Temperature Solid Phase Method 0.85 mmol $Y_2O_3$, 0.12 mmol $Eu_2O_3$ and 1 mmol $GeO_2$ are placed in an agate mortar and ground to be mixed uniformly. The remaining steps are the same as those in example 1 and a red emission fluorescent powder $(Y_{0.85}Eu_{0.12})_2GeO_5$ is obtained therewith. FIG. 3 is the excitation and emission spectrums of $(Y_{0.85}Eu_{0.12})_2GeO_5$. It can be seen from the figure that the sample has multiple excitation peaks at 276 nm, 395 nm and 466 nm when monitored at 612 nm and can emit a red light of 612 nm when excited at 395 nm.

Example 9

$(Y_{0.89}Gd_{0.1}Tm_{0.01})_2GeO_5$ Prepared by High Temperature Solid Phase Method 0.89 mmol $Y_2O_3$, 0.1 mmol $Gd_2O_3$, 0.01 mmol $Tm_2O_3$ and 1 mmol $GeO_2$ are placed in an agate mortar and ground to be mixed uniformly. The remaining steps are the same as those in example 1 and a blue emission fluorescent powder $(Y_{0.89}Gd_{0.1}Tm_{0.01})_2GeO_5$ is obtained therewith.

Example 10

$(Y_{0.69}Gd_{0.3}Tm_{0.01})_2GeO_5$ Prepared by High Temperature Solid Phase Method 0.69 mmol $Y_2O_3$, 0.3 mmol $Gd_2O_3$, 0.01 mmol $Tm_2O_3$ and 1 mmol $GeO_2$ are placed in an agate mortar and ground to be uniformly mixed. The remaining steps are the same as those in example 1 and a blue emission fluorescent powder $(Y_{0.69}Gd_{0.3}Tm_{0.01})_2GeO_5$ is obtained therewith.

Example 11

$(Y_{0.89}Gd_{0.1}Ho_{0.01})_2GeO_5$ Prepared by High Temperature Solid Phase Method 0.89 mmol $Y_2O_3$, 0.1 mmol $Gd_2O_3$, 0.01 mmol $Ho_2O_3$ and 1 mmol $GeO_2$ are placed in an agate mortar and ground to be mixed uniformly. The remaining steps are the same as those in example 1 and a green emission fluorescent powder $(Y_{0.89}Gd_{0.1}Tm_{0.01})_2GeO_5$ is obtained therewith.

Example 12

$(Y_{0.88}Gd_{0.1}Sm_{0.02})_2GeO_5$ Prepared by High Temperature Solid Phase Method 0.88 mmol $Y_2O_3$, 0.1 mmol $Gd_2O_3$, 0.02 mmol $Sm_2O_3$ and 1 mmol $GeO_2$ are placed in an agate mortar and ground to be mixed uniformly. The remaining steps are the same as those in example 1 and a red emission fluorescent powder $(Y_{0.88}Gd_{0.1}Sm_{0.02})_2GeO_5$ is obtained therewith.

Example 13

$(Y_{0.88}Gd_{0.1}Dy_{0.02})_2GeO_5$ Prepared by High Temperature Solid Phase Method 0.88 mmol $Y_2O_3$, 0.1 mmol $Gd_2O_3$, 0.02 mmol $Dy_2O_3$ and 1 mmol $GeO_2$ are placed in an agate mortar and ground to be mixed uniformly. The remaining steps are the same as those in example 1 and a white emission fluorescent powder $(Y_{0.88}Gd_{0.1}Dy_{0.02})_2GeO_5$ is obtained therewith.

Example 14

$(Y_{0.84}Gd_{0.1}Tb_{0.06})_2GeO_5$ Prepared by High Temperature Solid Phase Method 0.84 mmol $Y_2O_3$, 0.1 mmol $Gd_2O_3$, 0.06 mmol $Tb_4O_7$ and 1 mmol $GeO_2$ are placed in an agate mortar and ground to be mixed uniformly. The remaining steps are the same as those in example 3 and a green emission fluorescent powder $(Y_{0.84}Gd_{0.1}Tb_{0.06})_2GeO_5$ is obtained therewith.

Example 15

$(Y_{0.75}Gd_{0.1}Eu_{0.15})_2GeO_5$ Prepared by High Temperature Solid Phase Method 0.75 mmol $Y_2O_3$, 0.1 mmol $Gd_2O_3$, 0.15 mmol $Eu_2O_3$ and 1 mmol $GeO_2$ are placed in an agate mortar and ground to be mixed uniformly. The remaining steps are the same as those in example 1 and a red emission fluorescent powder $(Y_{0.75}Gd_{0.1}Tb_{0.15})_2GeO_5$ is obtained therewith.

Example 16

$(Y_{0.89}La_{0.1}Tm_{0.01})_2GeO_5$ Prepared by High Temperature Solid Phase Method 0.89 mmol $Y_2O_3$, 0.1 mmol $La_2O_3$, 0.01 mmol $Tm_2O_3$ and 1 mmol $GeO_2$ are placed in an agate mortar and ground to be mixed uniformly. The remaining steps are the same as those in example 1 and a blue emission fluorescent powder $(Y_{0.89}La_{0.1}Tm_{0.01})_2GeO_5$ is obtained therewith.

Example 17

$(Y_{0.89}Lu_{0.1}Tm_{0.01})_2GeO_5$ Prepared by High Temperature Solid Phase Method 0.89 mmol $Y_2O_3$, 0.1 mmol $Lu_2O_3$, 0.01 mmol $Tm_2O_3$ and 1 mmol $GeO_2$ are placed in an agate mortar and ground to be mixed uniformly. The remaining steps are the same as those in example 1 and a blue emission fluorescent powder $(Y_{0.89}Lu_{0.1}Tm_{0.01})_2GeO_5$ is obtained therewith.

Example 18

$(Y_{0.89}Sc_{0.1}Tm_{0.01})_2GeO_5$ Prepared by High Temperature Solid Phase Method 0.89 mmol $Y_2O_3$, 0.1 mmol $Sc_2O_3$, 0.01 mmol $Tm_2O_3$ and 1 mmol $GeO_2$ are placed in an agate mortar and ground to be mixed uniformly. The remaining steps are the same as those in example 1 and a blue emission fluorescent powder $(Y_{0.89}Sc_{0.1}Tm_{0.01})_2GeO_5$ is obtained therewith.

Example 19

$(Y_{0.89}Sc_{0.1}Tm_{0.01})_2GeO_5$ Prepared by High Temperature Solid Phase Method 0.89 mmol $Y_2(CO_3)_3$, 0.1 mmol $Sc_2(C_2O_4)_3$, 0.02 mmol $Tm(CH_3COO)_3$ and 1 mmol $GeO_2$ are placed in an agate mortar and ground to be mixed uniformly. The remaining steps are the same as those in example 1 and a blue emission fluorescent powder $(Y_{0.89}Sc_{0.1}Tm_{0.01})_2GeO_5$ is obtained therewith.

Example 20

$(Y_{0.7}Tm_{0.3})_2GeO_5$ Prepared by High Temperature Solid Phase Method 0.7 mmol $Y_2(CO_3)_3$, 0.3 mmol $Tm_2(C_2O_4)_3$ and 1 mmol $GeO_2$ are placed in an agate mortar and ground to be mixed uniformly. The remaining steps are the same as those in example 1 and a blue emission fluorescent powder $(Y_{0.7}Tm_{0.3})_2GeO_5$ is obtained therewith.

Example 21

$(Y_{0.8}Eu_{0.2})_2GeO_5$ Prepared by High Temperature Solid Phase Method 1.6 mmol $Y(CH_3COO)_3$, 0.4 mmol $Eu(CH_3COO)_3$ and 1 mmol $GeO_2$ are placed in an agate mortar and ground to be mixed uniformly. The remaining steps are the same as those in example 1 and a red emission fluorescent powder $(Y_{0.8}Eu_{0.2})_2GeO_5$ is obtained therewith.

Example 22

$(Y_{0.999}Ho_{0.001})_2GeO_5$ Prepared by High Temperature Solid Phase Method 1.998 mmol $Y(CH_3COO)_3$, 0.002 mmol $Ho(CH_3COO)_3$ and 1 mmol $GeO_2$ are placed in an agate mortar and ground to be mixed uniformly. The remaining steps are the same as those in example 1 and a green emission fluorescent powder $(Y_{0.999}Ho_{0.001})_2GeO_5$ is obtained therewith.

The invention claimed is:

1. A germanate luminescence material, wherein the germanate luminescence material is a compound of following formula: $(Y_{1-x}Ln_x)_2GeO_5$, wherein, Y in the formula is partly substituted by at least one selected from a group of Lu, Sc and La, wherein a range of x is $0<x\leq0.3$ and Ln is one selected from a group of Ce, Tm, Ho, Sm, and Dy;
the germanate luminescence material is suitable to be excited in a range of 220-480 nm.

2. The germanate luminescence material according to claim 1, wherein the range of the x is $0<x\leq0.2$.

3. A method for preparing the germanate luminescence material of claim 1, wherein the method comprises taking oxide of Ln or Ge, carbonate of Ln or Ge, oxalate of Ln or Ge, acetate of Ln or Ge, nitrate of Ln or Ge, or halide of Ln or Ge, and oxide of Lu, Sc, La and Y, carbonate of Lu, Sc, La and Y, oxalate of Lu, Sc, La and Y, acetate of Lu, Sc, La and Y, nitrate of Lu, Sc, La and Y or halide of Lu, Sc, La and Y as raw material; wherein Ln is one selected from a group of Ce, Tm, Ho, Sm and Dy; grinding the raw material uniformly, and then sintering the raw material at 1450-1500° C. for 6-10 h, and cooling a sintered product to room temperature, and obtaining the germanate luminescence material.

4. A method for preparing the germanate luminescence material of claim 2, wherein the method comprises taking oxide of Ln or Ge, carbonate of Ln or Ge, oxalate of Ln or Ge, acetate of Ln or Ge, nitrate of Ln or Ge, or halide of Ln or Ge, and oxide of Lu, Sc, La and Y, carbonate of Lu, Sc, La and Y, oxalate of, Lu, Sc, La and Y, acetate of Lu, Sc, La and Y, nitrate of Lu, Sc, La and Y or halide of Lu, Sc, La and Y as raw material; wherein Ln is one selected from a group of Ce, Tm, Ho, Sm, and Dy; grinding the raw material uniformly, and then sintering the raw material at 1450-1500° C. for 6-10 h, and cooling a sintered product to room temperature, and obtaining the germanate luminescence material.

5. The method for preparing the germanate luminescence material according to claim 3, wherein the method comprises weighing the raw material in a stoichiometric ration of formula $(Y_{1-x}Ln_x)_2GeO_5$.

6. The method for preparing the germanate luminescence material according to claim 4, wherein the method comprises weighing the raw material in a stoichiometric ration of formula $(Y_{1-x}Ln_x)_2GeO_5$.

* * * * *